March 2, 1954   R. H. BOWEN   2,670,550
DITCHING BLADE ATTACHMENT FOR TRACTOR OPERATED PLOWS
Filed June 30, 1950   2 Sheets-Sheet 2
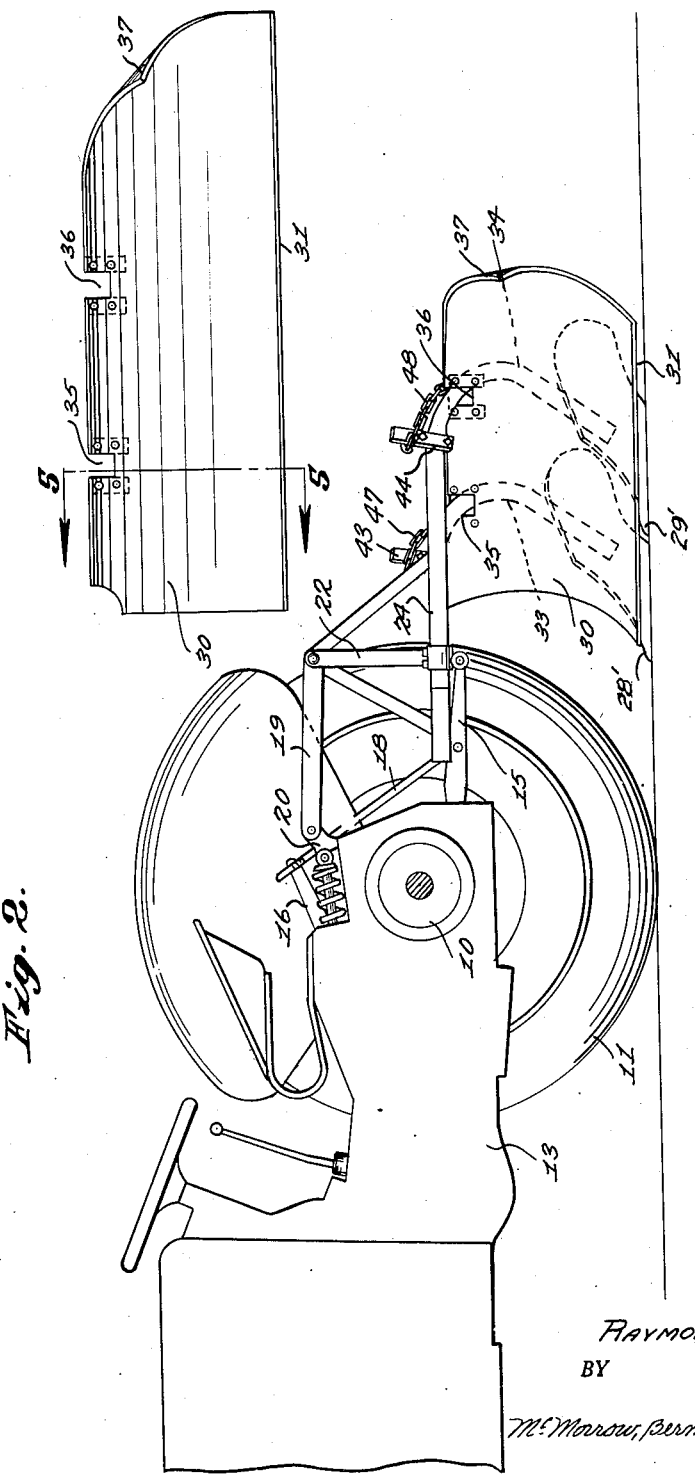
INVENTOR.
RAYMOND H. BOWEN
BY
McMorrow, Berman + Davidson
ATTORNEYS Patented Mar. 2, 1954

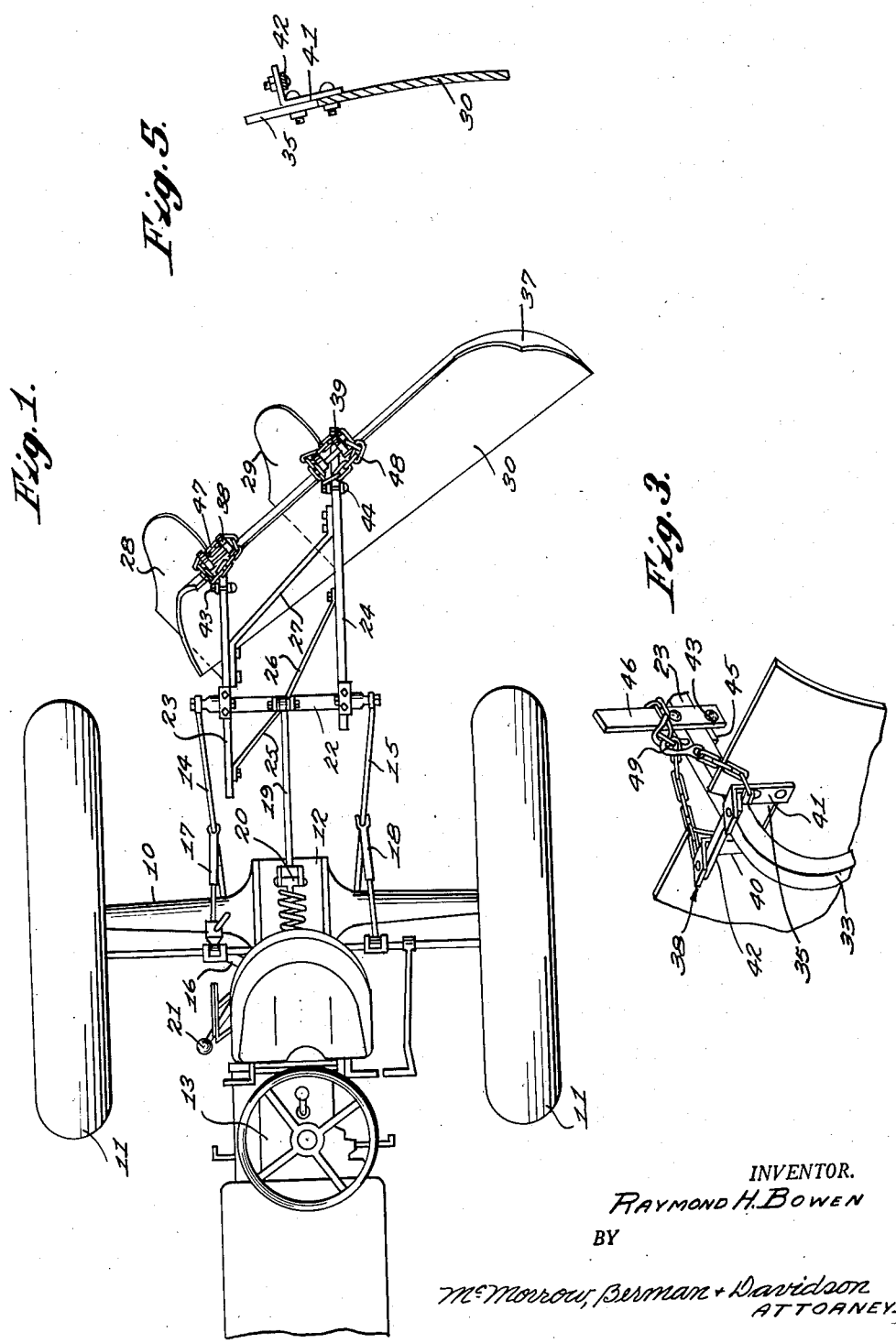

2,670,550

UNITED STATES PATENT OFFICE 2,670,550

DITCHING BLADE ATTACHMENT FOR TRACTOR OPERATED PLOWS

Raymond H. Bowen, Holley, N. Y.

Application June 30, 1950, Serial No. 171,378

3 Claims. (Cl. 37—98)

This invention relates to blade attachments for plows and more particularly to a ditching blade attachment for a two bottom, tractor operated plow.

It is among the objects of the invention to provide a ditching blade attachment for a tractor operated plow which blade attachment, when mounted on a plow, converts the plow into a ditching implement which can also be used as a snow plow and for other purposes, which attachment can be quickly and easily applied to an existing plow with no material modification of the plow construction, and which is simple and durable in construction, economical to manufacture, and positive and effective in use.

Other objects and advantages will become apparent from a consideration of the following description and the appended claims in conjunction with the accompanying drawings wherein:

Figure 1 is a top plan view of a tractor and a tractor connected plow with a ditching blade illustrative of the invention operatively mounted on the plow:

Figure 2 is a side elevational view of the tractor, plow and ditching blade assembly illustrated in Figure 1, one of the rear wheels of the tractor being removed to better illustrate the tractor construction;

Figure 3 is a perspective view of a fragmentary portion of the blade and plow showing the manner of attaching the blade to the plow;

Figure 4 is a plan view of the blade; and

Figure 5 is a cross sectional view of the blade taken on the line 5—5 of Figure 4.

With continued reference to the drawings, the tractor illustrated in Figures 1 and 2 is an existing form of farm tractor of the type known to the trade as a Ford-Ferguson, Ford or Ferguson tractor and has a rear axle 10 supported by rear wheels 11 journalled at respectively opposite ends of the rear axle, a differential mechanism 12 at the mid-length location of the rear axle, a transmission mechanism 13 connected to the differential mechanism and constituting a part of the tractor frame, a pair of tension links 14 and 15 pivotally connected at their front ends to the rear axle 10 at respectively opposite sides of the differential mechanism 12 and extending rearwardly from the rear axle, a lift shaft 16 carried by the tractor above and somewhat ahead of the differential mechanism, struts 17 and 18 connected between the respectively opposite ends of the lift shaft 16 and the tension links 14 and 15 intermediate the length of the latter, and a compression link 19 connected at its front end to a rocker arm 20 which controls the automatic operation of the tractor implement lifting valve. A manually operated lever 21 is connected to this valve to change the setting of the valve so that the implement can be completely raised and lowered under manual control.

A triangular structure 22 is connected at its apex to the rear end of the compression link 19 and is pivotally connected at the respectively opposite ends of its base to the rear ends of the tension links 14 and 15.

The plow comprises two plow beams 23 and 24 rigidly secured intermediate their length to the structure 22 and disposed in spaced apart and substantially parallel relationship to each other. These plow beams are held substantially perpendicular to the base of the structure 22 by diagonal braces 25 and 26 and are held in substantially parallel relationship to each other by a diagonal brace 27 connected at its opposite ends to the beams 23 and 24 respectively.

The beam 23 is curved downwardly at its rearward ends to provide a plow stem 33 and a plow bottom including the usual mold board 28 is mounted on this stem. The beam 24 is curved downwardly to provide a plow stem 34 and a plow bottom, including the mold board 29 is mounted on this stem.

The blade 30 is a steel plate of elongated rectangular shape having a thickness of approximately ¼ inch and transversely curved to a partly cylindrical shape.

This plate is secured to the plow with its lower edge 31 slightly above the plow points 28' and 29', as illustrated in Figure 2, and so that its upper edge extends substantially to the top of the plow beams 23 and 24 at the upper ends of the plow stems 33 and 34. The plate is provided in its upper edge with two rectangular notches 35 and 36 which receive the plow beams 23 and 24 respectively and the length of the plate and the location of these notches is such that when the plow beams are received in the notches one end of the plate extends slightly beyond the front edge of the mold board 28 of the leading plow and the other end of the plate extends away from the front edge of the mold board 29 of the other plow a distance substantially equal to the distance between the two plows.

The upper corner of the plate at the end thereof remote from the plows is curved forwardly, as indicated at 37 to give this end of the blade a somewhat spoon or mold board shape for turning earth at this end of the blade inwardly.

Bracket structures 38 and 39 are provided adjacent the notches 35 and 36 respectively and each of these brackets as particularly illustrated in Figure 3, comprises two flat L-shaped members 40 and 41 disposed at respectively opposite sides of the corresponding notch with their stems substantially perpendicular to the top edge of the plate and their upper end portions disposed substantially at right angles to their stem portions and extending away from the convex side of the plate. A short bar 42 is connected at its opposite ends to the outwardly extending portions of the members 40 and 41.

Clamps 43 and 44 are secured to the plow beams 23 and 24 respectively a short distance ahead of the upper edge of the blade. Each of these clamps, as is also particularly illustrated in Fig. 3, includes a member 45 of rectangular form which receives the plow beam and an upstanding stem or bar 46 secured to the member 45.

The blade is secured to the plow beams by short chains 47 and 48 of which the chain 47 extends around the bracket 38 under the corresponding bar 42 and the outwardly extending upper end portions of the bracket members 40 and 41 and around the stem 46 of the associated clamp 43. This chain is provided at one end with a hook 49 so that the chain can be tightly engaged around the corresponding bracket and clamp stem. The chain 48 is similarly engaged around the bracket 39 and the stem of the clamp 44.

When the plow beams are received in the notches 35 and 36 of the blade the blade will remain in operative position on the plow as long as the plow is lowered and the plow bottoms and the blades are in operative position. However, when the plow is raised by the implement lift mechanism of the tractor, the blade would fall off of the plow if it were not held securely in place by the chains 47 and 48.

With this arrangement the point of the forward plow acts as a cutting or digging implement which cuts the adjacent lower corner of the blade into the ground. With the plow bottoms disposed one ahead of the other, the blade is inclined relative to the draft line of the plow outwardly and rearwardly from the leading plow bottom and when its lower corner adjacent the leading plow bottom is cut into the ground it moves the displaced earth rearwardly and toward its end remote from the leading plow bottom.

The implement control mechanism of the tractor holds the blade and plow bottoms at the proper operating depth, and the mold board of the leading plow bottom resists the end thrust of the blade and provides a rounded edge at the corresponding edge of the ditch. The downward pressure of the implement control mechanism causes the blade to incline upwardly away from the leading plow, providing an inclined slope at the opposite side of the ditch.

The plow and blade combination may also be used as a terracing plow or as a snow plow and for other purposes which will be apparent to those skilled in the art.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is:

1. A ditching implement comprising a two bottom plow having spaced apart and substantially parallel beams each formed at one end to provide a curved plow stem one of which is disposed rearwardly of the other, and plow bottoms secured one on each stem and each having a substantially vertically disposed and concavely curved front edge, a blade of elongated rectangular shape transversely curved so that its convex side fits the curved front edges of said plow bottoms and disposed against the front edges of said plow bottoms and extending outwardly beyond the rearwardly disposed plow bottom, said blade having spaced apart notches in the upper edge thereof respectively receiving said plow beams, and means secured to said blade adjacent said notches and engaging said beams to secure said blade to said plow.

2. A ditching implement comprising a two bottom plow having spaced apart and substantially parallel beams each formed at one end to provide a curved plow stem, and plow bottoms secured one on each stem and each having a substantially vertically disposed and concavely curved front edge, a blade of elongated rectangular shape transversely curved so that its convex side fits the curved front edges of said plow bottoms, disposed against the front edges of said plow bottoms and stems, said blade having spaced apart notches in one edge thereof respectively receiving said plow beams, and means secured to said blade adjacent said notches and engaging said beams to secure said blade to said plow, one of said plow bottoms being disposed ahead of the other and said blade being inclined relative to the draft line of the plow and extending outwardly beyond the rearwardly disposed plow bottom.

3. A ditching implement comprising a two bottom plow having spaced apart and substantially parallel beams each formed at one end to provide a curved plow stem, and plow bottoms secured one on each stem and each having a substantially vertically disposed and concavely curved front edge, a blade of elongated rectangular shape transversely curved so that its convex side fits the curved front edges of said plow bottoms, said blade having spaced apart notches in one edge thereof respectively receiving said plow beams, and means secured to said blade adjacent said notches and engaging said beams to secure said blade to said plow, one of said plow bottoms being disposed ahead of the other so that said blade is inclined rearwardly from said one bottom relative to the draft line of the plow and said notches being so disposed longitudinally of said blade that one end of said blade is adjacent said one plow bottom and the other end of said blade is spaced from the side of the other of said plow bottoms remote from said one bottom.

RAYMOND H. BOWEN.

References Cited in the file of this patent

UNITED STATES PATENTS

| Number | Name | Date |
|---|---|---|
| 404,437 | Ruddell | June 4, 1889 |
| 772,367 | McLaughlin | Oct. 18, 1904 |
| 1,504,334 | Fidler | Aug. 12, 1924 |
| 1,803,917 | Powell | May 5, 1931 |
| 1,982,038 | Williams | Nov. 27, 1934 |
| 2,374,312 | Tackett | Apr. 24, 1945 |
| 2,584,675 | Dangerfield | Feb. 8, 1952 |